(12) United States Patent
Yoo et al.

(10) Patent No.: US 11,435,782 B2
(45) Date of Patent: Sep. 6, 2022

(54) MOBILE TERMINAL

(71) Applicant: LG ELECTRONICS INC., Seoul (KR)

(72) Inventors: Inseok Yoo, Seoul (KR); Wonseok Joo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 352 days.

(21) Appl. No.: 16/827,916

(22) Filed: Mar. 24, 2020

(65) Prior Publication Data

US 2021/0223820 A1  Jul. 22, 2021

(30) Foreign Application Priority Data

Jan. 20, 2020 (WO) ................ PCT/KR2020/000931

(51) Int. Cl.
 *G06F 1/16* (2006.01)
 *H04M 1/02* (2006.01)

(52) U.S. Cl.
 CPC .......... *G06F 1/1624* (2013.01); *G06F 1/1652* (2013.01); *H04M 1/0235* (2013.01)

(58) Field of Classification Search
 CPC .... G06F 1/1624; G06F 1/1652; G06F 1/1656; G06F 1/1677; G06F 1/1681; H04M 1/0235; H04M 1/0268; H04M 1/0237
 See application file for complete search history.

(56) References Cited

U.S. PATENT DOCUMENTS

| | | | | |
|---|---|---|---|---|
| 10,938,970 | B1* | 3/2021 | Lee | H04M 1/0237 |
| 2013/0058063 | A1* | 3/2013 | O'Brien | G06F 1/1624 |
| | | | | 361/807 |
| 2017/0068275 | A1* | 3/2017 | Lee | G06F 1/1652 |
| 2017/0364119 | A1* | 12/2017 | Lee | G06F 1/1656 |
| 2018/0181164 | A1* | 6/2018 | Chen | G06F 1/1624 |

(Continued)

FOREIGN PATENT DOCUMENTS

| | | |
|---|---|---|
| CN | 110599912 A | 12/2019 |
| EP | 3258675 A1 | 12/2017 |

(Continued)

*Primary Examiner* — Lewis G West
(74) *Attorney, Agent, or Firm* — Birch, Stewart, Kolasch & Birch, LLP

(57) ABSTRACT

A mobile terminal including a first frame; a second frame configured to move from the first frame in a first direction to switch the mobile terminal from a first state to a second state and to slidably move toward the first frame in a second direction to switch the mobile terminal from the second state to the first state; a slide frame configured to move in the first direction or the second direction with respect to the second frame; a flexible display including a first region coupled to the first frame, a second region coupled to the slide frame, and a third region disposed between the first region and the second region, the third region flexibly bending around the second frame; and a drive unit configured to move the second frame in the first direction. Further, the drive unit includes a driving elastic part configured to provide a tension force and having one end fixed to the first frame and an opposite end fixed to the second frame; and a stopper configured to maintain the driving elastic part in a compressed state when the mobile terminal is in the first state.

20 Claims, 9 Drawing Sheets

(56) References Cited

U.S. PATENT DOCUMENTS

| | | | | |
|---|---|---|---|---|
| 2021/0212221 A1* | 7/2021 | Diboine | ................ | G09F 21/049 |
| 2021/0243905 A1* | 8/2021 | Kim | ...................... | G06F 1/1624 |
| 2021/0307185 A1* | 9/2021 | Hong | .................... | G06F 1/1656 |
| 2021/0360807 A1* | 11/2021 | Yu | ........................... | G06F 1/186 |

FOREIGN PATENT DOCUMENTS

| KR | 10-2017-0025520 A | 3/2017 |
|---|---|---|
| KR | 10-2017-0116551 A | 10/2017 |
| KR | 10-2017-0136951 A | 12/2017 |
| KR | 10-2017-0141438 A | 12/2017 |

\* cited by examiner (a)

(b)

(a)

(b)

(a)

(b)

(a)

(b)

(a)

(b)

(a)

(b)

MOBILE TERMINAL

CROSS-REFERENCE TO RELATED APPLICATION

Pursuant to 35 U.S.C. § 119, this application claims the benefit of priority to PCT International Application No. PCT/KR2020/000931 filed on Jan. 20, 2020, the contents of which are all hereby incorporated by reference herein in its entirety.

BACKGROUND OF THE INVENTION

Field of the Invention

The present disclosure relates to a mobile terminal, and more particularly, to a mobile terminal provided with a flexible display and capable of increasing the size of a screen when the display scrolls and slides.

Discussion of the Related Art

Terminals can be generally classified as mobile/portable terminals or stationary terminals. Mobile terminals can also be classified as handheld terminals or vehicle mounted terminals.

In addition, a display device includes functions of receiving, processing and displaying user-viewable images. The display device, for example, receives broadcasting selected by a user from broadcast signals broadcasted by a broadcasting station, splits video signals from the received signals, and displays the split video signals on a display.

Recently, owing to the developments of broadcast and network technologies, functions of a display device have been considerably diversified and performance of the device has been improved correspondingly. Namely, the display device has been developed so as to provide a user with various contents as well as simply broadcasted contents. For example, the display device can provide game play, listening to music, Internet shopping, user-customized information and the like using various applications as well as programs received from broadcasting stations. In order to perform such extended functions, the display device is basically connected to other devices or a network using various communication protocols and can provide ubiquitous computing environments to a user. Thus, the display device has been evolved into a smart device that enables connectivity to a network and ubiquitous computing.

Recently, a flexible display capable of large deformation with sufficient elasticity has been developed. The size of the mobile terminal can thus be varied based on deformation of the flexible display. As described above, for a mobile terminal having a variable structure, the structure of the mobile terminal needs to be stably changed, and an issue may be raised in relation to the support structure of the variable display unit.

SUMMARY OF THE INVENTION

An object of the present disclosure is to provide a drive unit capable of providing a driving force for extension of a frame without a motor.

In one aspect of the present disclosure, a mobile terminal includes a first frame, a second frame configured to move from the first frame in a first direction to switch from a first state to a second state and to slidably move in a second direction to switch from the second state to the first state, the second direction being a direction opposite to the first direction, a slide frame configured to move in the first direction or the second direction with respect to the second frame, a flexible display comprising a first region coupled to the first frame, a second region coupled to the slide frame, and a third region disposed between the first region and the second region, the third region being bent by surrounding the second frame, and a drive unit configured to provide force for moving the second frame in the first direction, wherein the drive unit may include a driving elastic part having one end fixed to the first frame and an opposite end fixed to the second frame, the driving elastic part being configured to provide tension force, and a stopper configured to fix the driving elastic part in a compressed state.

Further scope of applicability of the present disclosure will become apparent from the detailed description given below. However, various changes and modifications within the spirit and scope of the present disclosure may be clearly understood by those skilled in the art, and therefore the detailed description and specific embodiments, such as the preferred embodiments of the present disclosure, should be understood as being given by way of example only.

DETAILED DESCRIPTION OF THE EMBODIMENTS

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Although the terms first, second, etc. may be used herein to describe various elements, these elements should not be limited by these terms. These terms are generally only used to distinguish one element from another. When an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Figure 1:
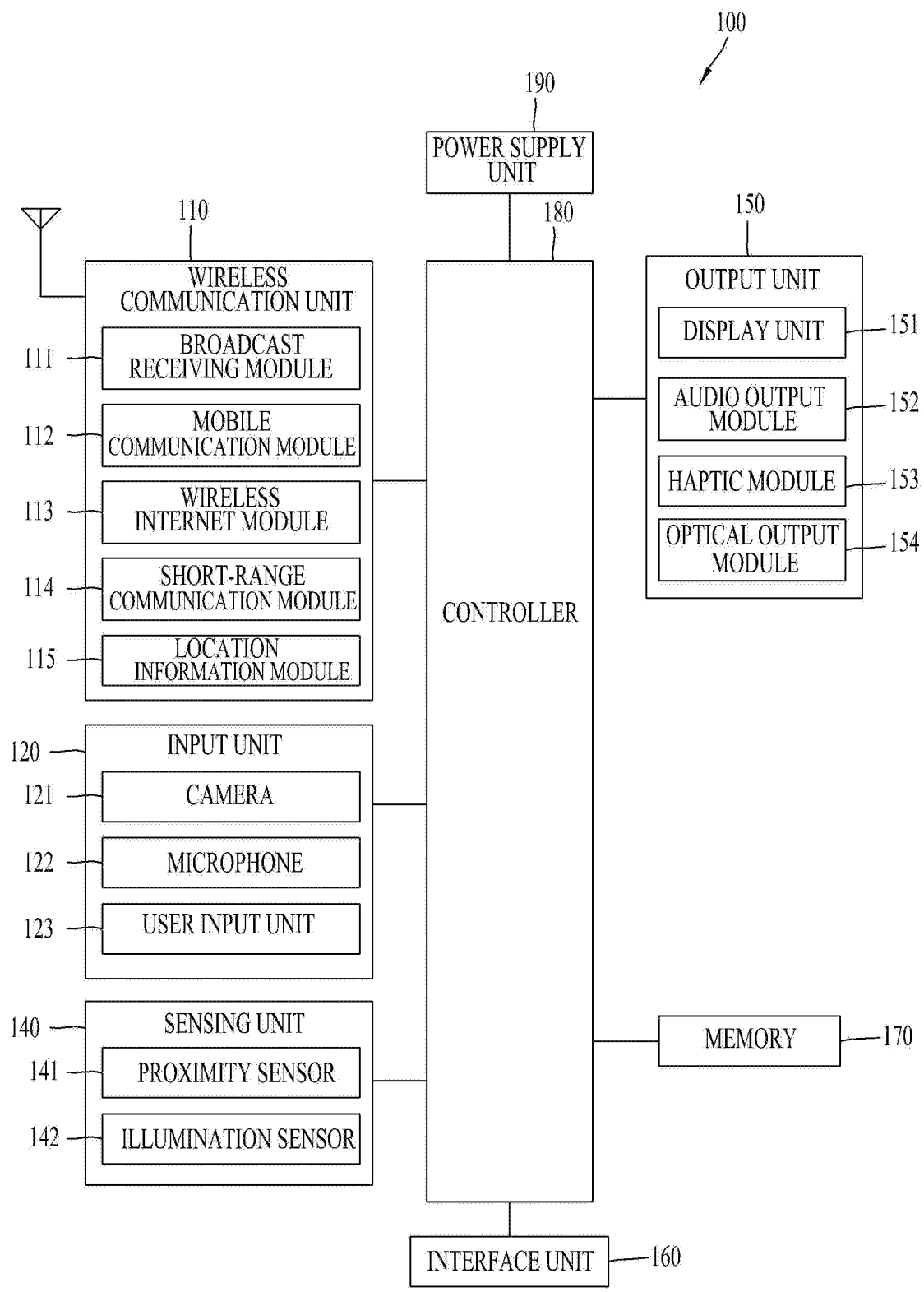
FIG. 1 is a block diagram of a mobile terminal in accordance with the present disclosure.

FIG. 1 is a block diagram of a mobile terminal in accordance with an embodiment of the present disclosure. The mobile terminal 100 is shown having components such as a wireless communication unit 110, an input unit 120, a sensing unit 140, an output unit 150, an interface unit 160, a memory 170, a controller 180, and a power supply unit 190. Implementing all of the illustrated components in The FIG. 1 is not a requirement, and that greater or fewer components may alternatively be implemented.

More specifically, the wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE) , LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH TM, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

Cameras 121 can process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. Further, the virtual key or the visual key may be displayed on the touch screen in various shapes, for example, graphic, text, icon, video, or a combination thereof.

The sensing unit 140 is typically implemented using one or more sensors configured to sense internal information of the mobile terminal, the surrounding environment of the mobile terminal, user information, and the like. For example, the sensing unit 140 may alternatively or additionally include other types of sensors or devices, such as a proximity sensor 141 and an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 can utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 can have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 can store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 can provide or process information or functions appropriate for a user by processing signals, data, information and the like, which are input or output, or activating application programs stored in the memory 170.

To drive the application programs stored in the memory 170, the controller 180 can be implemented to control a predetermined number of the components mentioned above in reference with FIG. 1. Moreover, the controller 180 can be implemented to combinedly operate two or more of the components provided in the mobile terminal 100 to drive the application programs.

The power supply unit 190 can be configured to receive external power or provide internal power in order to supply appropriate power required for operating elements and components included in the mobile terminal 100. The power supply unit 190 may include a battery, and the battery can be embedded in the terminal body, or configured to be detachable from the terminal body.

Some or more of the components may be operated cooperatively to embody an operation, control or a control method of the mobile terminal in accordance with embodiments of the present disclosure. Also, the operation, control or control method of the mobile terminal may be realized on the mobile terminal by driving of one or more application problems stored in the memory 170.

Figure 2:
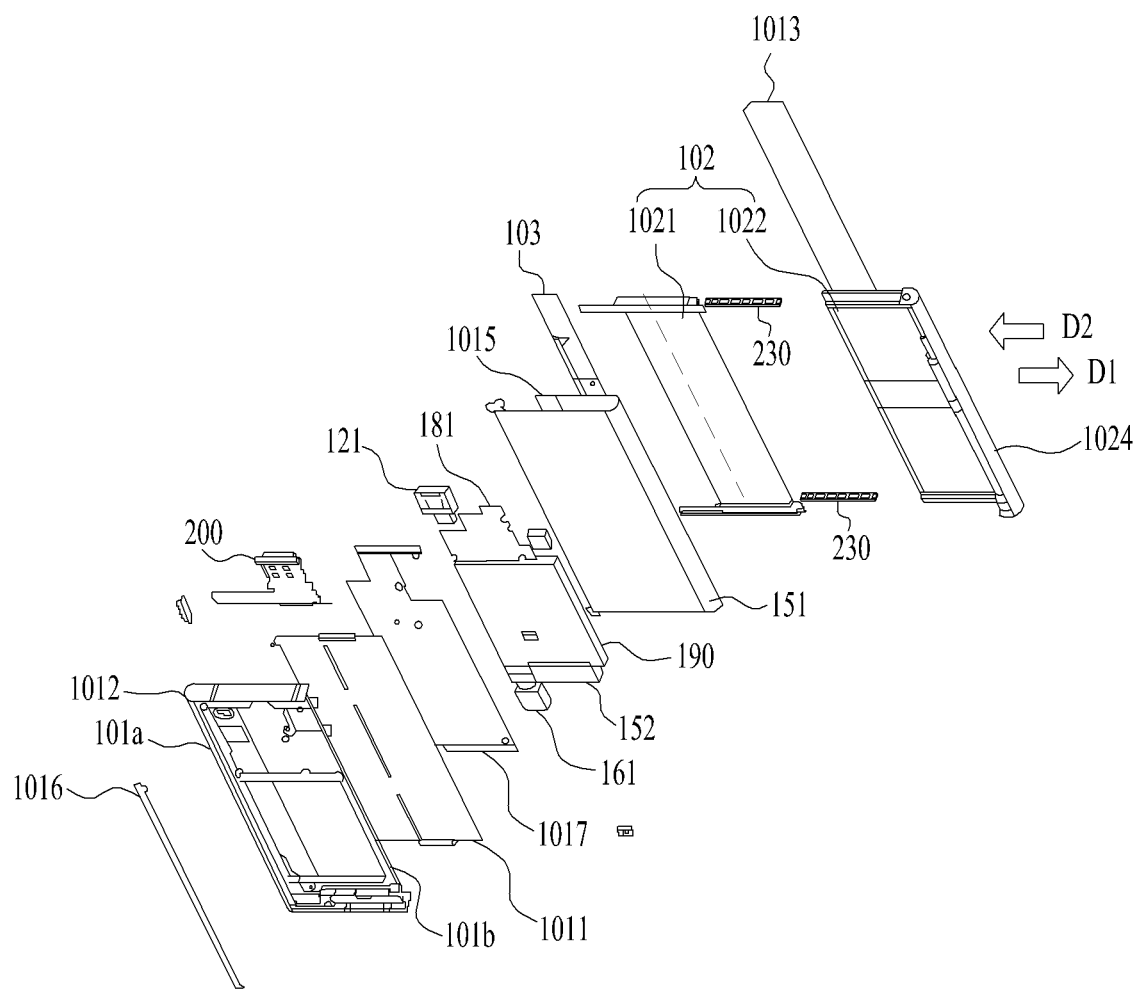
FIG. 2 is an exploded perspective view of the mobile terminal.
Figure 3:
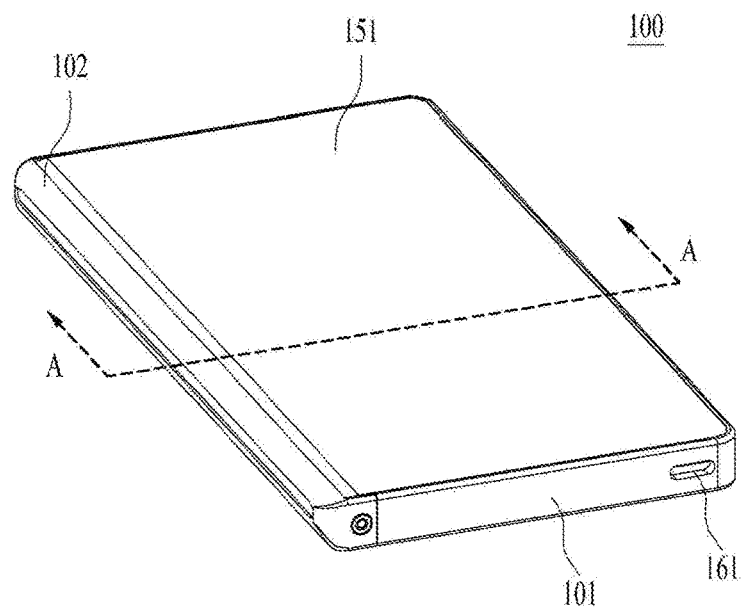
FIG. 3 is a perspective view illustrating a first state and a second state of the mobile terminal viewed from one side.
Figure 3:
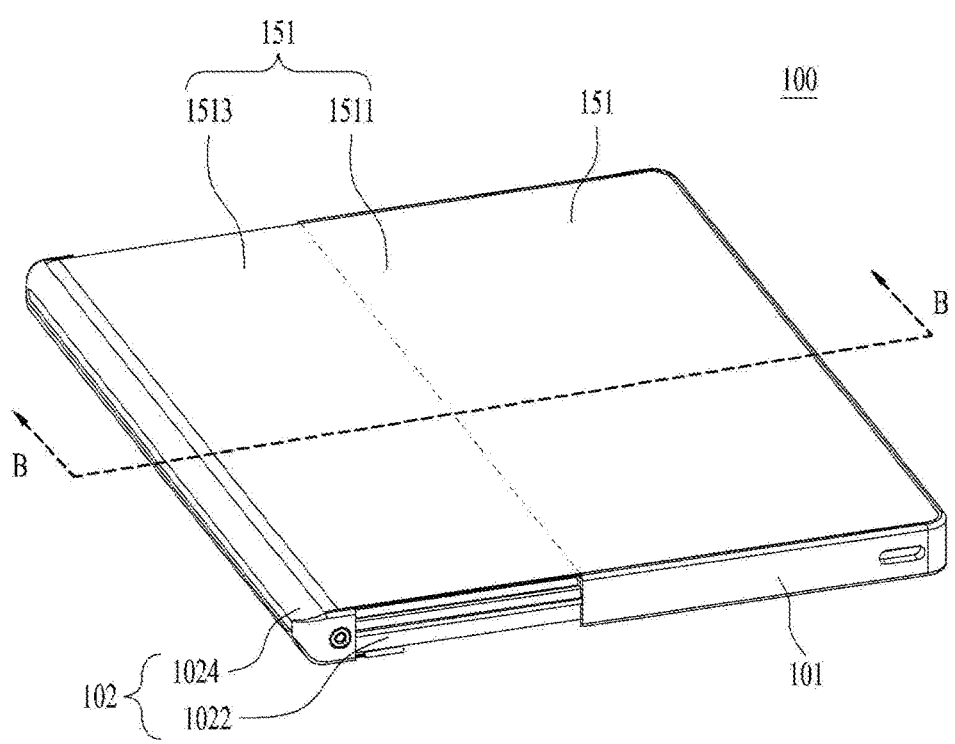
Figure 4:
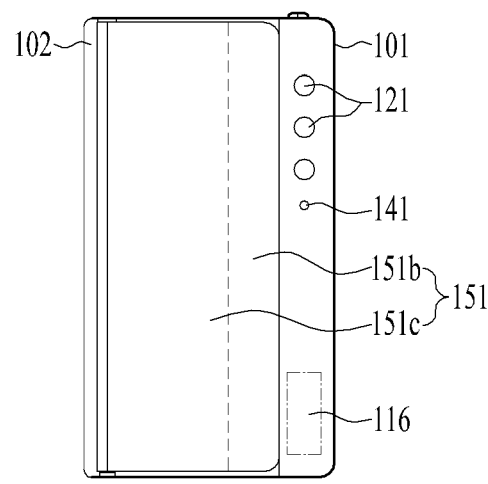
FIG. 4 is a rear view illustrating a first state and a second state of the mobile terminal.
Figure 4:
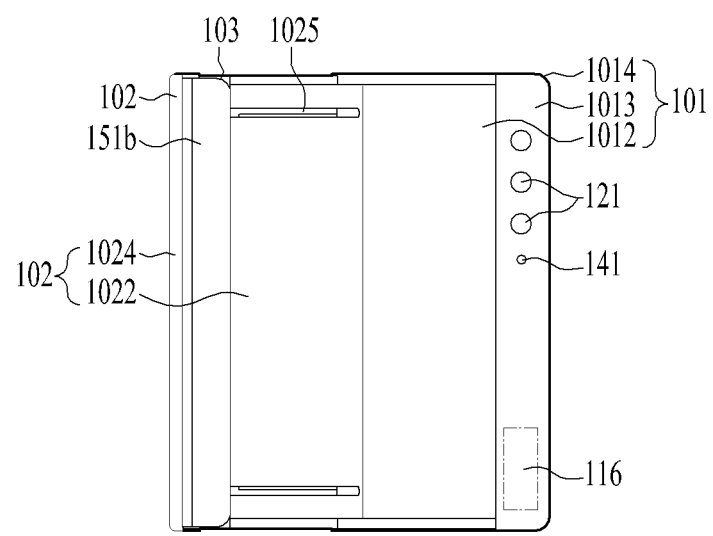
Figure 5:
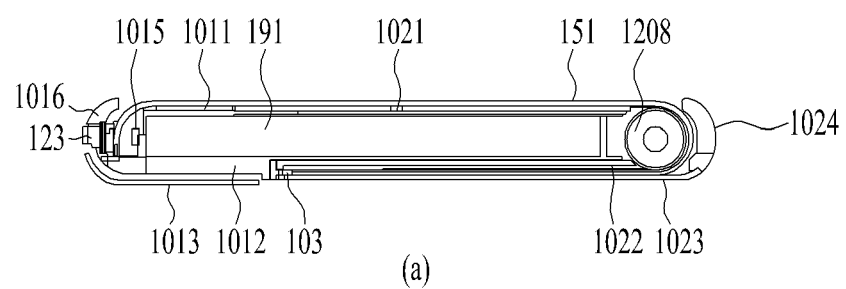
FIG. 5 is a cross-sectional view taken along lines A-A and B-B of FIG. 3.
Figure 5:
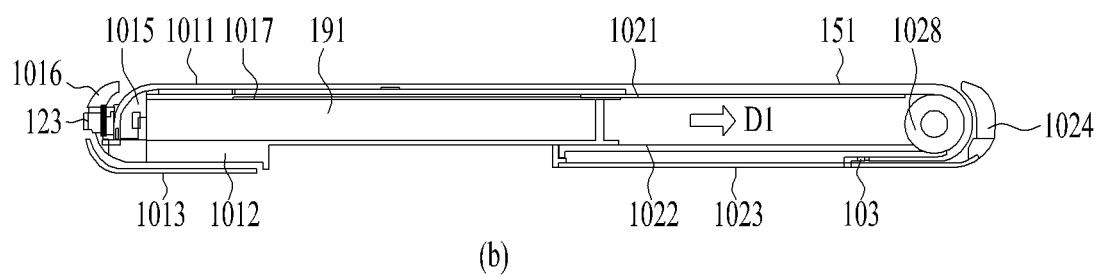

Next, FIG. 2 is an exploded perspective view of a mobile terminal according to the present disclosure, FIG. 3 is a perspective view illustrating a first state and a second state of the mobile terminal viewed from one side, FIG. 4 is a rear view illustrating the first state and second state of the mobile terminal, and FIG. 5 is a cross-sectional view taken along lines A-A and B-B of FIG. 3. Specifically, FIGS. 3(a), 4(a) and 5(a) show the first state of the mobile terminal, and FIGS. 3(b), 4(b) and 5(b) show the second state of the mobile terminal.

As shown in the figures, a mobile terminal 100 in the first state is retracted to have a smaller size than in the second state. In the first state, the size of the display unit 151, which is arranged on the front of the mobile terminal 100, is also smaller than in the second state. Further, when the mobile terminal 100 in the first state is extended in a first direction D1, the mobile terminal 100 switches to the second state. In the second state, the size of the mobile terminal 100 and the size of the front portion of the display unit 151 are larger than those in the first state as shown in FIG. 3(b), and the size of the rear portion of the display unit 151 is reduced as shown in FIG. 4(b). That is, the display unit 151 positioned on the back of the mobile terminal 151 in the first state moves to the front of the mobile terminal 100 in the second state.

In the following description, the direction in which the mobile terminal 100 and the display unit 151 thereof are extended or enlarged is defined as a first direction D1, and the direction in which the mobile terminal contracts or retracts or is reduced to switch from the second state to the first state is defined as a second direction D2. A direction perpendicular to the first and second directions D1 and D2 is defined as a third direction.

In this way, a flexible display unit 151 which is bendable may be used as the display unit such that the position of the display unit may be varied. The flexible display means a display, which is manufactured on a thin and flexible substrate capable of being curved, bent, folded, twisted or rolled like paper, and is thus lightweight and robust as not to be easily broken while maintaining characteristics of the existing flat panel display.

Also, electronic paper is based on a display technique to which a feature of a general ink is applied, and is different from the existing flat panel display in that it uses reflective light. The electronic paper may change information by using electrophoresis that uses a twist ball or capsule.

When the flexible display unit 151 is not deformed (for example, the state that the flexible display unit 151 has an infinite radius of curvature, hereinafter, referred to as base state), a display area of the flexible display unit 151 becomes a plane. In a state (for example, the state having a finite curvature radius, hereinafter, referred to as a deformation state) deformed by an external force from the base state, the display area may be a curved surface. As shown, information displayed in the deformation state may be visual information output to the curved surface. This visual information is implemented as luminescence of unit sub-pixels arranged in a matrix arrangement is controlled independently. The unit sub-pixel means a minimum unit for implementing one color.

The flexible display unit 151 can be arranged in a bent state (for example, the state bent in a vertical or horizontal direction) not a flat state in the base state. In this instance, if an external force is applied to the flexible display unit 151, the flexible display unit 151 can be deformed in a flat state (or less bent state) or a more bent state.

The flexible display unit 151 can implement a flexible touch screen in combination with a touch sensor. If a touch is performed for a flexible touch screen, the controller 180 (see FIG. 1) can perform a control corresponding to such a touch input. The flexible touch screen can also be configured to sense a touch input even in the deformation state as well as the base state.

Further, the touch sensor senses a touch (or touch input) applied to the touch screen by using at least one of various touch modes such as a resistive film mode, a capacitance mode, an infrared mode, an ultrasonic mode, and a magnetic field mode. As an example, the touch sensor can convert a change of a pressure applied to a specific portion of the touch screen or a change of capacitance occurring in the specific portion to an electric input signal. The touch sensor can allow a touch target, which performs a touch on the touch screen, to detect a touch position, a touch area, a touch pressure and touch capacitance on the touch sensor.

In addition, mobile terminal 100 may include a deformation detection mechanism configured to detect deformation of the flexible display unit 151. Such deformation sensing mechanism may be included in the sensing unit 140 (see FIG. 1). The deformation sensing mechanism may be provided in the flexible display unit 151 or a case (a first frame 101 and a second frame 102, which will described later) to detect information related to deformation of the flexible display unit 151.

Here, the information related to the deformation may include a direction in which the flexible display unit 151 is deformed, a degree of deformation, a deformed position, a deformation time, and an acceleration at which the flexible display unit 151 returns from the deformed position to the original position. The information may further include various kinds of information that may be detected according to bending of the flexible display unit 151.

Also, the controller 180 can modify information displayed on the flexible display unit 151 or generate a control signal for controlling functions of the mobile terminal 100, based on the information related to deformation of the flexible display unit 151 sensed by the deformation sensing means. Switching of the flexible display unit 151 to a state (the first or second state), that is, change in size of the display unit 151 on the front and back of the mobile terminal 100 according to change in size of the mobile terminal 100 can be performed manually by the force exerted by the user, but is not limited to this manual operation.

For example, the mobile terminal 100 or the flexible display unit 151 in the first state can be deformed to switch to the second state by a command from a user or an application without external force applied by the user. In order to automatically deform the flexible display unit 151 without external force, the mobile terminal 100 includes a drive unit 200, which will be described later.

The flexible display unit 151 of the present disclosure is bent 180 degrees by rolling around a side portion of the mobile terminal 100 facing in the first direction. Accordingly, a part of the display unit 151 is disposed on the front of the mobile terminal 100 with respect to the side portion of the mobile terminal 100, and the other part of the display unit 151 is disposed on the back of the mobile terminal 100. A part of the display unit 151 positioned on the front of the mobile terminal 100 can be immovably fixed on the front, and the other part thereof positioned on the back of the mobile terminal 100 can be movably arranged on the back.

In addition, the display unit 151 can be rolled or unrolled around the side portion, thereby moving a part thereof disposed on the back of the mobile terminal 100 to adjust the size of the region thereof disposed on the front of the mobile terminal 100. The flexible display unit 151 has a predetermined area and includes one continuous body. Accordingly, as the area of the front portion of the flexible display unit 151 increases, the area of the rear portion of the flexible display unit 151 decreases. Further, the display unit 151 configured as described above can be rolled in a second frame 102, which is movable with respect to a first frame 101, more specifically, around one side portion of the second frame 102, which will be described later. The display unit 151 can be withdrawn or pulled out or from the second frame 102 or inserted or pushed thereinto while being rolled around the second frame 102 according to movement of the second frame 102 to adjust the area of the display unit 151 on the front of the mobile terminal 100. This operation will described in more detail below in connection with the other related components of the mobile terminal 100.

Typically, an antenna is provided in the case or housing of the mobile terminal 100. However, a position where the antenna may be installed in the case or housing may be limited by the flexible display unit 151, which covers the front and back of the mobile terminal 100. For this reason, an antenna may be implemented on the flexible display unit 151. The antenna on display (AOD) is an antenna of a transparent film formed by laminating a patterned electrode layer and a dielectric layer. The AOD may be implemented to be thinner than when implemented with the conventional laser direct structuring (LDS) technique, which is implemented with copper nickel plating. Accordingly, the AOD may neither affect the thickness nor be exposed to the outside. In addition, with the AOD, the display unit 151 can directly transmit and receive signals. Therefore, the mobile terminal 100 provided with the display unit 151 on both sides as in the present disclosure may employ an AOD.

The mobile terminal 100 includes frames 101 and 102 on which components are mounted. The size of the frames 101 and 102 of the present disclosure may vary in the first direction as shown in FIG. 2. When at least one frame 101, 102 makes a relative movement, the size thereof varies in the first direction. Electronic components are mounted inside the frames 101 and 102, and the flexible display unit 151 is disposed outside of the frames 101 and 102.

As the mobile terminal 100 of the present disclosure includes the flexible display unit 151, the flexible display unit 151 can be coupled thereto by surrounding the front and rear surfaces of the frames 101 and 102. The frames include a first frame 101 and a second frame 102 movable in the first direction with respect to the first frame 101. The first frame 101 and the second frame 102 may also each include a front portion, a rear portion and a side portion, and be coupled to each other. Thus, the first frame 101 and the second frame 102 coupled to each other define the appearance of the mobile terminal 100, which has a hexahedral shape.

In addition, the first frame 101 may correspond to the main body of the mobile terminal 100 and define a space therein to accommodate various components. In addition, the first frame 101 may accommodate, in the defined space, the second frame 102 movably coupled to the first frame 101. More specifically, as best shown in FIGS. 2 and 5, the first frame 101 may include a first front portion 1011 disposed on the front of the mobile terminal 100 to support the front portion of the display unit 151, and a first rear portion 1012 disposed on the rear side of the mobile terminal 100, various components being mounted on the first rear portion 1012.

The first front portion 1011 and the first rear portion 1012 are spaced apart from each other by a predetermined distance so as to define a predetermined space therebetween and are connected to each other by a side portion 1014. In particular, the side portion 1014 can be integrated with the first rear portion 1012 or the first front portion 1011. In addition, the camera 121, the audio output module 152, an input/output terminal 161, the controller 180 and the power supply unit 190, which are components of the mobile terminal 100, may be accommodated in the space in the first frame 101. For example, the controller 180 can be a circuit board 181 including a processor and an electronic circuit configured to control the operation of the mobile terminal, and the power supply unit 190 may include a battery 191 and related components. A drive unit 200 configured to control slide movement of the second frame 102, which will be described later, can also be accommodated in the first frame 101.

As described above, the display unit 151 can have a continuous body and be disposed on both the front and back of the mobile terminal 100 while being rolled in the mobile terminal 100. In more detail, the display unit 151 can include a front portion positioned on the front of the mobile terminal 100, a rear portion positioned on the back of the mobile terminal 100, and a lateral side portion positioned between the front portion and the rear portion to surround the lateral side of the mobile terminal. The front portion and the rear portion may be flat, and the lateral side portion may form a curved surface. In addition, the flexible display unit 151 may be broken when it is bent. Thus, the flexible display unit 151 can be configured to be bent with a predetermined curvature.

The display unit 151 can be divided into a fixed part and a variable part. In particular, the fixed part means a part fixed to the frame. Since it is fixed to the frame, the fixed part maintains a constant shape with a bending degree thereof unchanged. On the other hand, the variable part means a part in which the bending angle of the bent portion is variable or the position of the bent portion is changed. The variable part having a variable bending position or angle needs a structure to support the rear surface of the variable part according to the change.

In addition, the fixed part is coupled to the first frame of the display unit and is constantly positioned at the front to form part of the front portion. The variable part includes a side portion positioned on a side of the mobile terminal. The position of the side portion varies depending on the position of the second frame. Also, the areas of a region located on the front and a region located on the back with respect to the side portion vary. In other words, a portion of the variable part may be a front portion and the other part thereof may be a rear portion according to the first state and the second state. The variable part is positioned on the side facing in the first direction with respect to the fixed portion in the mobile terminal, and an end of the variable part is bent to the rear side of the mobile terminal while sliding on the rear surface of the second frame.

An end of the variable part of the display unit is coupled to a slide frame for guiding a slide movement on the rear surface of the second frame. The slide frame moves on the second frame in the first direction when the second frame moves in the first direction. As a result, the moving distance of the slide frame with respect to the first frame is twice the moving distance thereof with respect to the second frame. As shown in FIG. 4, the first rear portion 1012 of the mobile terminal 100 may include an exposed rear portion 1013 that is not covered by the display unit 151 but is exposed to the outside even in the first state. The physical input units 120, such as various buttons, switches, the camera 121, and flash, and the sensing unit 140, such as the proximity sensor 141 or a fingerprint sensor, may be disposed on the exposed rear portion 1013. Also, the first rear portion 1012 except for the exposed rear portion 1013 is covered by the display unit 151 in the first state as shown in FIG. 4(a), and is exposed rearward in the second state as shown in FIG. 4(b).

For a typical bar-type terminal, the display unit is arranged only on the front of the terminal. Therefore, a main camera is disposed on the back of the terminal to allow a user to photograph an object on the opposite side while viewing the object through the display unit 151. In addition, an auxiliary camera is required to be arranged on the front of the terminal in order for the user to photograph himself while viewing his or her image through the display unit.

However, for the mobile terminal 100 of the present disclosure, the display unit 151 is arranged on both the front and back of the mobile terminal 100. Accordingly, in photographing the user, a portion of the display unit 151 on the same surface as the camera 121, that is, the display unit 151 on the back of the mobile terminal 100 in the figure can be used. In photographing an object on the side opposing to the user, a portion of the display unit 151 on the opposite side of the camera 121, that is, the display unit 151 on the front of the mobile terminal 100 in the figure may be used. For this reason, the mobile terminal 100 can photograph an object located on the opposite side of the user or the user himself using one camera 121. In addition, the camera may include a plurality of cameras having different angles of view, such as wide angle, ultra wide angle, and telephoto angle. Not only the camera but also a proximity sensor and an audio output unit can be positioned on an exposed rear portion 1013, and an antenna 116 can be installed on the rear portion 1013. An exposed decor 1013 can also be used to attach and protect the camera, sensor, or the like on the exposed rear portion 1013 in consideration of the exterior design.

Further, the side portion 1014 can extend along the edges of the first front portion 1011 and the first rear portion 1012 to surround the circumference of the first frame 101 and can define the appearance of the mobile terminal 100. However, as mentioned above, the second frame 102 is accommodated in and movably coupled to the first frame 101, and therefore a portion of the first frame 101 needs to be open to allow movement of the second frame 102 relative to the first frame 101. As an example, as shown in FIG. 2, the second frame 102 can be movably coupled to one of both side portions of the first frame 101, and accordingly the side portion 1014 is not formed on the lateral surface facing in the first direction and can thus be open. Accordingly, the first frame 101 may include a first side portion 101a, which is substantially closed, and a second side portion 101b, which is disposed to face away from the first side portion 101a so as to be open. Since the side portion 1014 is exposed to the outside of the mobile terminal 100, the interface unit 160 for connecting a power port or an ear jack or the user input unit 120, such as a volume button, can be disposed on the side portion 1014. When the side portion 1014 contains a metal material, the side portion 1014 can serve as an antenna.

The second frame 102 may include a second front portion 1021 disposed on the front side of the mobile terminal 100 and a second rear portion 1022 disposed on the rear side of the mobile terminal 100. Like the first front portion 1011 and the first rear portion 1012 of the first frame 101, the second front portion 1021 and the second rear portion 1022 can be formed of a substantially flat plate member. In addition, the second frame 102 accommodates various components and should not interfere with the components accommodated in the first frame 101 during movement. Accordingly, the second front portion 1021 and the second rear portion 1022 can be coupled to each other with a predetermined space formed therebetween, and can have a shape that does not interfere with the components in the first frame 101.

The display unit 151 can be bent 180 degrees by being rolled in the second frame 102 so as to be disposed on both the front and back of the mobile terminal 100. To implement such an arrangement of the display unit 151, the second frame 102 may include a roller 1028 rotatably disposed therein. The roller 1028 can be disposed at any position inside the second frame 102. However, the display unit 151 should be spread flat on the front and back of the mobile terminal 100 in order to provide a good quality screen to the user. Tom implement such spreading, appropriate tension force should be applied to the display unit 151. In order to apply appropriate tension force, the roller 1028 can be disposed at an end of the second frame 102 facing in the first direction. The roller 1028 can extends in the second direction and be rotatably coupled to the second frame 102.

The display unit 151 can be rolled around the roller 1028 while being gently curved at a predetermined curvature. The flexible display unit 151 can include a first surface configured to output an image and exposed to the outside and an inner surface arranged on the opposite side to face the frame. The roller 1028 can be arranged to freely rotate on the second frame 102 while contacting the inner surface of the display unit 151. Accordingly, the roller 1028 can substantially move the display unit 151 in a lateral direction of the mobile terminal 100, namely, a direction perpendicular to the longitudinal direction. As will be described later, when the second frame 102 slides, the display unit 151 can be moved with respect to the second frame 102 in different directions (i.e., the first direction D1 or the second direction D2) toward the front or back of the mobile terminal 100 by the tension force applied by the second frame 102. Such a movement can be guided by rotation of the roller 1028.

Further, the roller 1028 is disposed on a first side portion 102a of the second frame 102. The first side portion 102a may substantially correspond to the outermost side portion of the mobile terminal 100. If the first side portion 102a of the second flame 102 is exposed, the display unit 151 rolled around the roller 1028 can be damaged. Accordingly, the second frame 102 may include a side frame 1024 disposed on the first side portion 102a.

The side frame 1024 can extend in the longitudinal direction of the second frame 102 to cover the first side portion 102a, thereby protecting the roller 1028 and the display unit 151 rolled therearound. The position can be varied according to the state of the mobile terminal. Since the lateral side portion is rolled by the roller, the lateral side portion can be curved at a predetermined curvature, and the inner side surface of the side frame may include a curved surface corresponding to the curvature of the lateral side portion.

Also, the first side portion 102a of the second frame 102 can be substantially closed by the side frame 102d. Thus, the side frame 102d can substantially define the appearance of the mobile terminal 100 in cooperation with the side portion 101d of the first frame 101. In addition, the second frame 102 may include a second side portion 102b that is open and disposed to face the first side portion 102a to minimize interference with the components arranged in the first frame 101 during movement.

The second frame 102 may be movably coupled to the first frame 101, and can thus be configured to slide in the predetermined first or second direction D1 or D2 with respect to the first frame 101. More specifically, as shown in the figure, the second frame 102 can be movably coupled to the first frame 101 via the side portion of the first frame 101, more specifically, the second side portion 101b that is open. More specifically, the second side portion 102b of the second frame can be disposed relatively adjacent to the first side portion 101a of the first frame 101, which is a closed portion, and thus the first side portion 102a of the second frame can be disposed to face the first side portion 101a. Thus, the second side portion 102b is inserted into the first frame 101 through the side portion of the first frame, namely, the second side portion 101b. The first side portion 102a can remain outside the first frame 101 without being inserted into the first frame 101, thereby defining the appearance of the mobile terminal 100 as described above. However, when necessary, the first side portion 102b of the second frame 102 can also be inserted into the first frame 101.

Due to such a positional relationship, the second frame 102 can extend or retract from or to the first frame 101 in a direction perpendicular to the longitudinal direction of the mobile terminal 100 or the first frame 101. That is, the first and second directions D1 and D2 can be perpendicular to the longitudinal direction of the mobile terminal 100 or the first frame 101. In other words, the first and second directions D1 and D2 may be the lateral direction or horizontal direction of the mobile terminal 100 or the first frame 101. In addition, in the movement in the first direction D1, the second frame 102 can extend from the first frame 101.

Thus, the first direction D1 may be a direction in which the second frame 102 moves away from the first frame 101, namely, outwardly of the mobile terminal 100 or the first frame 101. In the movement in the second direction D2, the second frame 102 retracts into the first frame 101. Accordingly, the second direction D2 may be a direction opposite to the first direction D1, and the second frame 102 can move closer to the second frame 101, that is, inwardly of the mobile terminal 100 or the first frame 101 in the second direction D1. When the second frame 102 is moved in the first direction D1, the second frame 102 can be extended to apply force to a part of the display unit 151 disposed on the back of the mobile terminal 100 such that the display unit 151 is further disposed on the front of the mobile terminal 100, and a region for such disposition can be formed. Accordingly, when moved in the first direction D1, the second frame 102 can switch the mobile terminal 100 to the second state in which the display unit 151 has a relatively extended front.

On the other hand, when moved in the second direction D2, the second frame 102 can retract to the original position and apply force to a part of the display unit 151 disposed on the front of the mobile terminal 100 such that the display unit 151 returns to the back of the mobile terminal 100.

Accordingly, when moved in the second direction D2, the second frame 102 can switch the mobile terminal 100 to the first state in which the display unit 151 has a relatively reduced front. Accordingly, the second frame 102 can selectively expose the display unit 151 on the front of the mobile terminal 100 according to the movement direction (i.e., the first or second direction D1 or D2), thereby switching the mobile terminal 100 to the first or second state as defined above.

During the extension and retraction in the first and second directions D1 and D2, the second frame 102 can overlap the first frame 101, more specifically, the first front portion 1011 and the first rear portion 1012 thereof so as not to interfere with the first frame 101. More specifically, as described above, the display unit 151 can be coupled to and supported by the first front portion 1011 of the first frame 101, and accordingly does not need to be additionally supported by the second front portion 1021 of the second frame 102. However, when the second front portion 1021 is interposed between the first front portion 1011 and the display unit 151, the display unit 151 can be deformed or broken due to friction against the second front portion 1021, which repeatedly moves. Thus, the second front portion 1021 can be disposed below the first front portion 1011 or can be inserted into the first front portion 1011, which consists of two layers.

The second rear portion 1022 of the second frame 102 can be disposed on the rear side of the first rear portion 1012 of the first frame 101. That is, the front surface of the second rear portion 1022 can face the rear surface of the first rear portion 1012. In addition, the rear surface of the first rear portion 1012 can contact the front surface of the second rear portion 1022 to stably support the movement of the second frame 102. By this arrangement, the second rear portion 1022 can be exposed to the outside of the first frame, specifically, the first rear portion 1012, and can be coupled to the display unit 151.

In addition, the second frame 102 can extend and retract in the first and second directions D1 and D2 to increase or reduce the size of the mobile terminal 100, in particular, the front of the mobile terminal 100. The display unit 151 is required to move as far as the extension or reduction of the front to obtain the first or second state as intended. However, when fixed to the second frame 102, the display unit 151 may not be smoothly moved according to the extension or reduction of the front of the mobile terminal 100. For this reason, the display unit 151 can be movably coupled to the second frame 102.

More specifically, the display unit 151 may include a first end (a side edge or side end) 151d disposed on the front of the mobile terminal 100 and a second end 151e opposing the first end and disposed on the back of the mobile terminal 100. The first end 151d can be disposed on the front surface of the first frame 101, that is, the front surface of the first front portion 1011 thereof, and arranged adjacent to the side portion of the mobile terminal 100, that is, the first side portion 101a of the first frame 101. Further, the second end 151e is adjacent to the back of the mobile terminal 100, i.e., the second rear portion 1022 of the second frame 102, and accordingly can be coupled to the second rear portion 1022 of the second frame 102 so as to move in the first and second directions D1 and D2. In addition, since the display unit 151 is not structurally strong, a slide frame 103 can be coupled to the second end 151e. The slide frame 103 can be formed of a plate member extending in the longitudinal direction of the mobile terminal 100

Accordingly, in place of the second end 151e, the slide frame 103 can be coupled to the second frame, that is, the second rear portion 1022 thereof, so as to move in the first and second directions D1 and D2. The second frame 102 may include a slot 1025 extending in the lateral direction of the mobile terminal 100 or the second frame 102, that is, the direction perpendicular to the longitudinal direction thereof. The slide frame 103 can be guided by the slot 1025 to stably move. The slide frame 103 may include, for example, a protrusion inserted into the slot 1025 for movement along the slot 1025.

Referring to FIGS. 3 to 5, in relation to the configuration of the first to third frames 101, 102, and 103, the display unit 151 can include a first region 151*a* extending from one side thereof, that is, the first end 151*d* by a predetermined length toward the second end 151*e* opposite to the first end 151*d*, and a second region 151*b* arranged to face the first region 151*a* and extending from the second end 151*e* by a predetermined length toward the first end 151*d*. The display unit 151 can further include a third region 151*c* disposed between the first and second regions 151*a* and 151*b*. The first to third regions 151*a*, 151*b*, and 151*c* can be connected to each other to form a continuous body of the display unit 151. In addition, as described above, in order to allow the third region 151*c* to move to the front or back of the mobile terminal 100 according to movement of the second frame 102, the first region 151*a* can be immovably fixed to the front of the mobile terminal 100 and the second region 151*b* can be movably arranged on the back of the mobile terminal 100. The display unit 151 configured as described above will be described in more detail below.

The first region 151*a* can be disposed on the front of the mobile terminal 100, more specifically, the front surface of the first front portion 1011 of the first frame 101. The first region 151*a* can be fixed to the front surface of the first frame 101, that is, the first front portion 1011 such that the first region 151*a* does not move when the second frame 102 is moved. Thus, the first region 151*a* can be constantly exposed on the front of the mobile terminal 100.

The third region 151*c* can be adjacent to the first region 151*a* toward the second end 151*e* and can be extended into the second frame 102 and rolled around the roller 1028. The third region 151*c* can continuously extend out of the second frame 102 to partially cover the second frame 102, that is, the rear surface of the second rear portion 1022. Since the second frame 102, that is, the second rear portion 1022, is arranged adjacent to the first frame 101, that is, the first rear portion 1012 to form the rear case of the mobile terminal 100 in conjunction therewith, the third region 151*c* can be disposed on the rear surface of the first frame 101.

The second region 151*b* can be adjacent to the third region 151*c* toward the second end 151*e* and disposed on the back of the mobile terminal 100, more specifically, the rear surface of the second rear portion 1022 of the second frame. The second region 151*b* can be coupled to the slide frame 103 rather than being coupled directly to the second frame 102. As shown in FIG. 4(*b*), a slot 1025 extending in a lateral direction (i.e., a direction perpendicular to the longitudinal direction of the mobile terminal 100) can be formed in the second frame 102, that is, the second rear portion 1022, such that the slide frame 103 can move along the slot 1025. While it is illustrated in FIG. 4(*b*) that the slot 1025 is formed in the rear surface of the second frame 102, the slot can be formed in the lateral side surface of the second frame 102.

The second region 151*b* can move together with the third frame 103 in the first or second direction D1 or D2 with respect to the second frame 102, but the slot 1025 can limit the movement of the second region 15 lb such that the movement takes place within the rear surface of the mobile terminal 100. That is, the second region 151*b* may not move beyond the second frame 102 when the second frame 102 extends or retracts. The second region 151*b* can move a distance of extension or retraction of the second frame 102 along the slot 1025 within the second frame 102. Accordingly, the second region 151*b* can be constantly exposed on the back of the mobile terminal 100.

As a result, the first region 151*a* can be disposed on the front of the mobile terminal 100 to remain exposed on the front regardless of the movement of the second frame 102, and the second region 151*b* can be disposed on the back of the mobile terminal 100 to remain exposed on the back regardless of the movement of the second frame 102. In addition, the third region 151*c* can be arranged between the first and second regions 151*a* and 151*b* so as to be selectively disposed on the front or back of the mobile terminal 100 according to the movement direction D1, D2 of the second frame 102.

Due to the selective disposition of the third region 151*c*, as shown in FIG. 4(*b*), a part of the first rear portion 1012 of the first frame 101 that is covered by the second and third regions 151*b* and 151*c* of the display unit 151 and the second rear portion 1022 in the first state can be exposed to the outside of the mobile terminal 100 in the second state because the third region 151*c* moves to the front of the mobile terminal 100 and the second rear portion 1022 moves in the first direction D1. In addition, the second front portion 1021 of the second frame 102 can be hidden by the first front portion 1011 of the first frame 101 in the first state, but can move out of the first frame 101 in the second state to support the third region 151*c* of the display unit 151 disposed on the front of the mobile terminal 100.

A separation plate 1017 can be further provided on the rear side of the second front portion 1021 and fastened to the first front portion 1011 to prevent the second front portion 1021 from affecting the internal components during the slide movement. The second front portion 1021 can move between the first front portion 1011 and the separator 1017 according to the slide movement of the second frame.

However, the third region 151*c* can be bent by being rolled around the roller 1028 in the second frame 102. In switching from the first state to the second state, the third region 151c can extend from the second frame 102 to the front of the mobile terminal 100 while being rolled around the roller 1028 in one direction. Further, in switching from the second state to the first state, the third region 151*c* can retract from the front of the mobile terminal 100 into the second frame 102 while being rolled around the roller 1028 in the opposite direction. Thereby, the third region 151*c* can return from the second frame 102 to the back of the mobile terminal 100.

A foldable mobile terminal that is unfoldable like a book is likely to be broken at a specific position thereon because it is repeatedly folded only at the specific position. Further, a deformed portion of the flexible display unit 151, that is, a portion rolled around the roller 1028, can vary according to the first and second states of the mobile terminal 100, that is, movement of the second frame 102. Therefore, the mobile terminal 100 of the present disclosure can significantly reduce deformation and fatigue repeatedly applied to a specific portion of the display unit 151, thereby preventing damage to the display unit 151.

Hereinafter, the overall operation of the mobile terminal 100 will be described based on the configuration described above. As an example, the state switching can be performed manually by a user. The operation of the mobile terminal 100 in the manual state switching is described below. However, the operation of the first to third frames 101 to 103 and the display unit 151 described below can be performed in the same manner even when a power source other than the force of the user, for example, a drive unit 200, which will be described later, is employed.

A rear cover 1023 can be further provided on the rear surface of the second rear portion 1022 such that the rear portion of the display unit located on the back of the mobile terminal 100 is not exposed to the outside. When the rear cover 1023 is formed of a transparent material, the rear portion is available even in the first state. When the rear cover is formed of an opaque material, it can cover the rear portion such that movement of the slide frame 103 is not exposed. That is, the second region and the third region of the slide frame 103 and the display unit 151 can move in the space between the second rear portion 1022 and the rear cover 1023 in the first and second directions. The exposed rear portion of the first rear portion 1012 can be further provided with an exposed decor 1013 to protect the camera 121, the sensor 140, or the like. A plate-shaped member of transparent glass can be partially coated with the exposed decor 1013 such that internal components except are not visible, and the necessary parts may not be coated such that light can reach the camera 121, the flash, or the sensing unit 140.

It is difficult to arrange the user input unit on the side frame 1024 positioned on the side of the first direction on which the second frame 102 is located because it is difficult to directly connect the side frame to the inside of the mobile terminal. Therefore, the user input unit 123 such as a volume button can be disposed on the side portion of the first frame 101 positioned on the side facing in the second direction.

Figure 6:
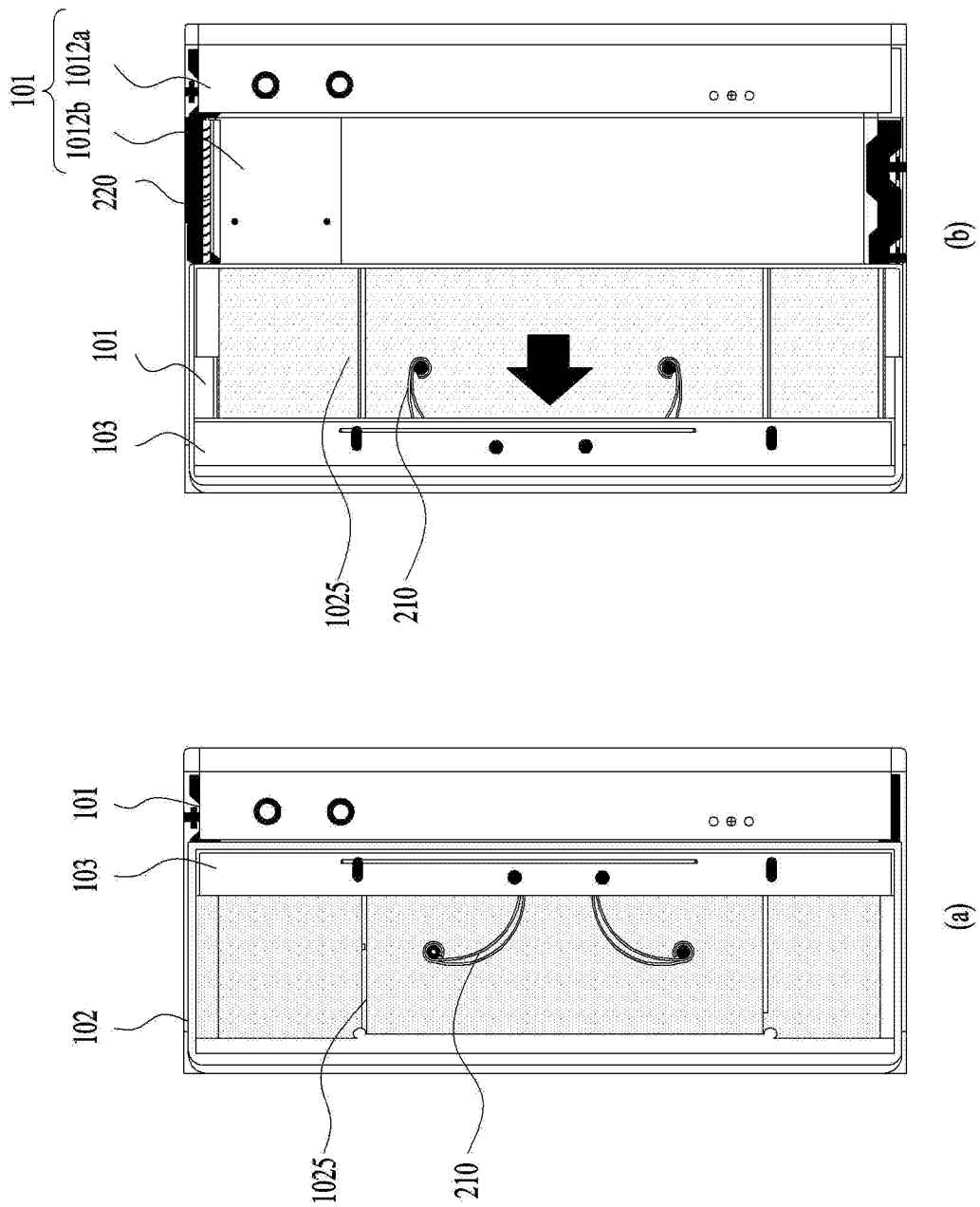
FIG. 6 is a rear view of the mobile terminal with the display unit removed.

FIG. 6 is a rear view of the mobile terminal 100 with the display unit 151 removed. FIG. 6(*a*) illustrates the first state, and FIG. 6(*b*) illustrates the second state. Since the figure shows the rear surface of the mobile terminal, the right side of the drawing corresponds to the first direction D1 and the left side of the drawing corresponds to the second direction. In the first state, the slide frame 103 is arranged on a side of the second frame 102 that faces in the second direction. When the second frame 102 moves in the first direction and switches to the second state, the slide frame 103 moves in the first direction with respect to the second frame 102. The slide frame 103 can move a distance corresponding to the moving distance of the second frame 102 in the same direction and change the area of the front portion of the display unit 151.

The slide frame 103 is coupled so as to move in the first direction or the second direction. Accordingly, if the slide frame 103 is not fixed in the first state, the display unit 151 can be separated when the slide frame 103 is pulled in the first direction. In order to prevent the display unit 151 from being separated, a torsion spring 210 configured to allow movement of the slide frame 103 while keeping the slide frame 103 pulled in the second direction can be further provided.

The torsion spring 210 can be a spring having a variable angle between one end and the opposite end thereof. The angle can be changed when force is applied to the torsion spring 210. The torsion spring 210 can have elasticity that tends to maintain the initial angle, and thus can restore the initial angle when the force is removed. To obtain such elasticity, the torsion spring 210 can have a curved shape as shown in FIG. 6, or can include a coil shape wound at least once between one end and the other end thereof.

In addition, one end of the torsion spring 210 can be coupled to the second frame 102 and the opposite end thereof can be coupled to the slide frame 103. When the slide frame 103 slides with respect to the second frame 102, the distance between one end and the opposite end of the torsion spring 210 can be changed, and thus the shape of the torsion spring 210 can be changed. As shown in FIG. 6(*a*), the torsion spring 210 tends to maintain a reference angle, and thus it applies force such that the slide frame 103 is positioned at the end of the second frame 102 facing in second direction.

As shown in FIG. 6(*b*), when the second frame 102 moves in the first direction to switch the mobile terminal to the second state, the distance between one end and the opposite end of the torsion spring 210 is reduced and the torsion spring 210 is compressed. When the slide frame 103 passes by a position of the second frame 102 at which the one end of the torsion spring 210 is coupled, the distance between the one end of the torsion spring 210 and the opposite end thereof can be increased, and the torsion spring 210 can restore the original shape, thereby changing the arrangement as shown in FIG. 6(*b*). However, the distance between the one end and the opposite end of the torsion spring 210 can remain the same as in the first state.

Further, in switching from the second state to the first state, the torsion spring 210 returns to the original position from a compressed position and moves the slide frame 103 to the position shown in FIG. 6(*a*). In the first state, the slide frame 103 can be fixed at the end of the second frame 102 facing in the second direction by the elasticity of the torsion spring 210.

Since the arrangement of the torsion spring 210 differs between the first state and the second state, the one end and the opposite end of the torsion spring 210 can be rotatably coupled to the second frame 102 and the slide frame 103 so as not to interfere with change of the arrangement, and thus the arrangement can change as shown in FIGS. 6(*a*) and 6(*b*).

The movement of the slide frame 103 and the movement of the second frame 102 take place simultaneously, and a drive unit 220 provides a driving force to move the second frame 102 in the first direction or the second direction. In more detail, the second frame 102 can be slid and moved using a motor. However, the size of the space occupied by the motor can be large, and noise can be generated when the motor is driven. In addition, when the second frame 102 is moved using the motor, the user can feel uncomfortable due to the slow speed.

Figure 7:
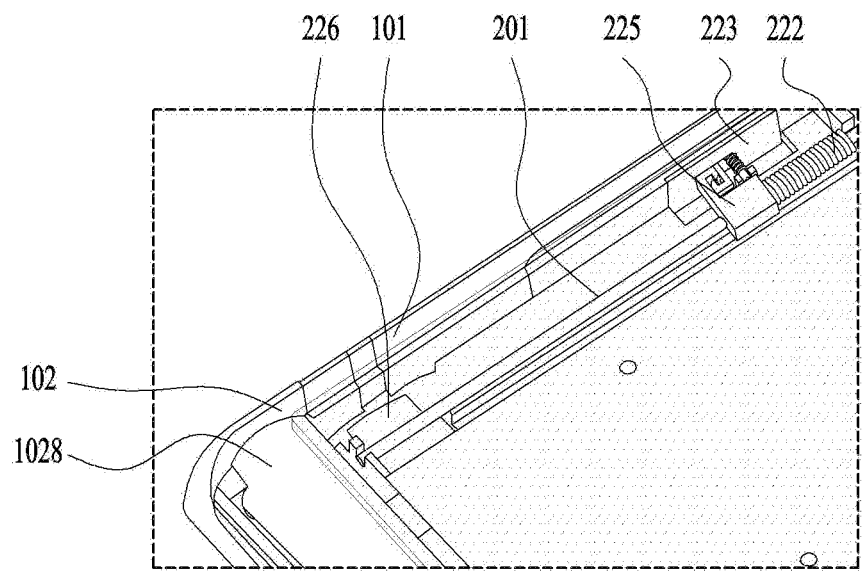
FIG. 7 is a view showing a drive unit of the mobile terminal.
Figure 7:
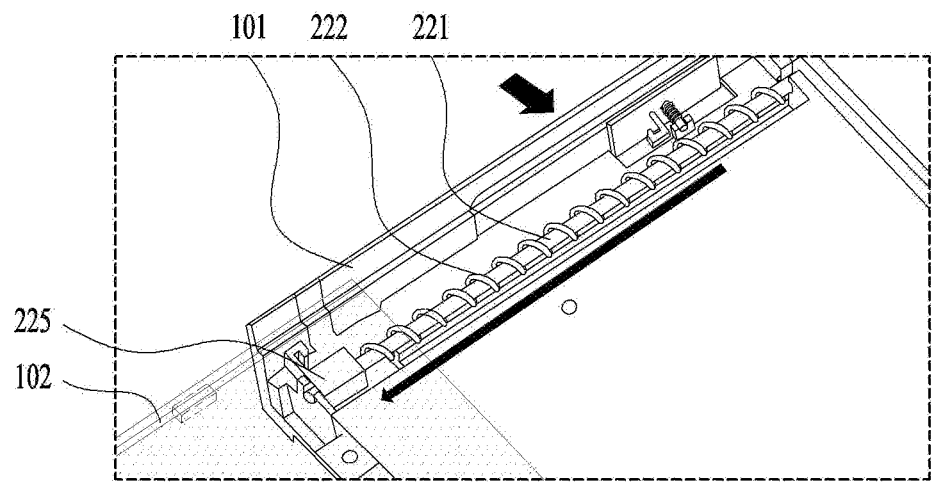

Accordingly, FIG. 7 is a view showing the drive unit 220 of the mobile terminal 100. In order to overcome the issue related to the drive unit 220 of the motor type, a driving elastic part 222 having elasticity can be employed. The driving elastic part 222 has one end fixed to the first frame 101 and an opposite end fixed to the second frame 102. The driving elastic part is compressed in the first state and provides force to the second frame 102 in the first direction to switch to the second state. The drive unit 220 may include a stopper configured to fix the driving elastic part 222 at a compressed position. When the stopper is released, the driving elastic part 222 is tensioned and is switched to the second state.

Figure 8:
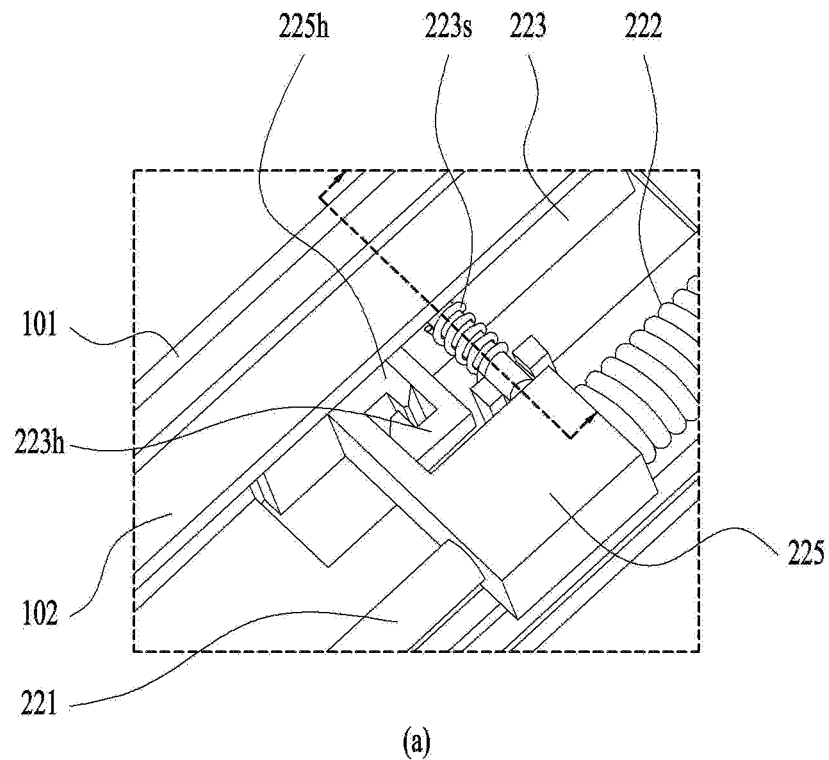
FIG. 8 is a view showing the structure of a stopper of the mobile terminal.
Figure 8:
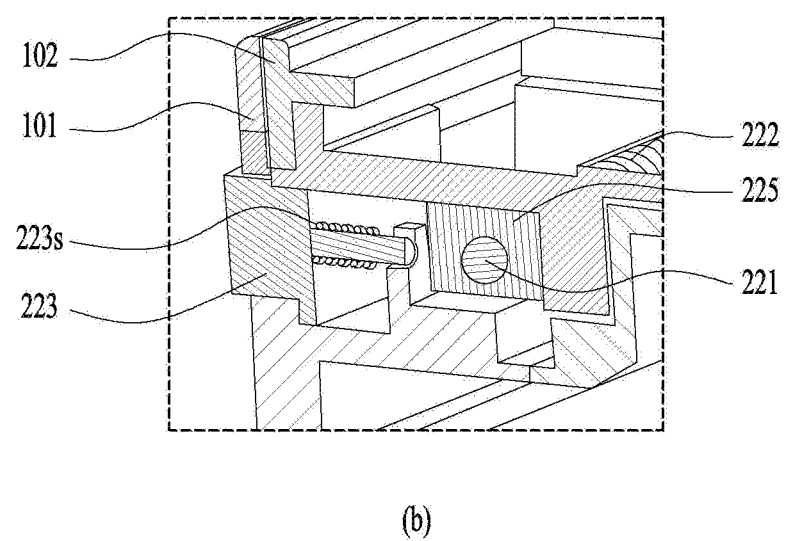

FIG. 8 is a view showing the structure of a stopper of the mobile terminal 100. The stopper may include a moving block 225 coupled to the opposite end of the driving elastic part 222 and fixed to the second frame 102, a first block 225*h* formed on the moving block 225, and a second hook 223*h* configured to fix the first block 225*h* to maintain the first state. As the moving block 225 is fixed to the second frame 102, the moving block 225 moves together with the second frame 102.

The second hook 223h disposed to be engaged with the first hook 225h can protrude from the inside of a mode button 223 exposed to the outside. The mode button 223 is arranged through the first frame 101. When it is pressed by the user, the engagement between the second hook 223h and the first hook 225h is released. To maintain the engagement between the second hook 223h and the first hook 225h when the button is not pressed by the user, a button elastic part 223s to apply force to the mode button 223 can be provided. When the user applies force greater than the elasticity of the button elastic part 223s to the mode button 223, the second hook 223h can be separated from the first hook 225h, the driving elastic part 222 can be tensioned, and the mobile terminal 100 can switch from the first state to the second state.

A guide pole 221 can be further provided to allow the moving block 225 to move only in the first direction or the second direction and prevent the moving block from shaking in the thickness direction or the longitudinal direction. The guide pole 221 is fixed to the first frame 101 by extending in the first direction and, and is arranged through the moving block 225 in a penetrating manner as shown in FIG. 8(b). The moving block 225 moves along the guide pole 221, and therefore the second frame 102 can slide in the first direction or the second direction without shaking.

The driving elastic part 222 can employ a compression spring as shown in FIG. 7 and can be disposed to surround the guide pole 221. When the second frame 102 moves in the second direction, the movement can be very fast because the movement is caused by elasticity of the driving elastic part 222. The driving elastic part 222 can be stopped when it extends to a reference length, but can extend beyond the reference length by elasticity. In the case where the moving block 225 moves at the same speed, the moving block can strike hit the first frame 101 and generate noise and vibration when it reaches the maximum movement position of the second frame 102.

The first frame 101 and the second frame 102 can degrade the usability of the mobile terminal 100, thereby deteriorating durability.. To address this issue, a deceleration part 226 to slow the movement caused by the elasticity of the driving elastic part 222 when the second state is reached is required.

The deceleration part 226 of the present embodiment can be formed on the first frame 101 at a position corresponding to the moving block 225 in the second state as shown in FIG. 7. It has a shape protruding from the first frame 101. Thus, as the moving block is fixed between the deceleration part 226 protruding from the first frame 101 and the second frame 102, the movement speed of the second frame 102 can be naturally reduced.

Figure 9:
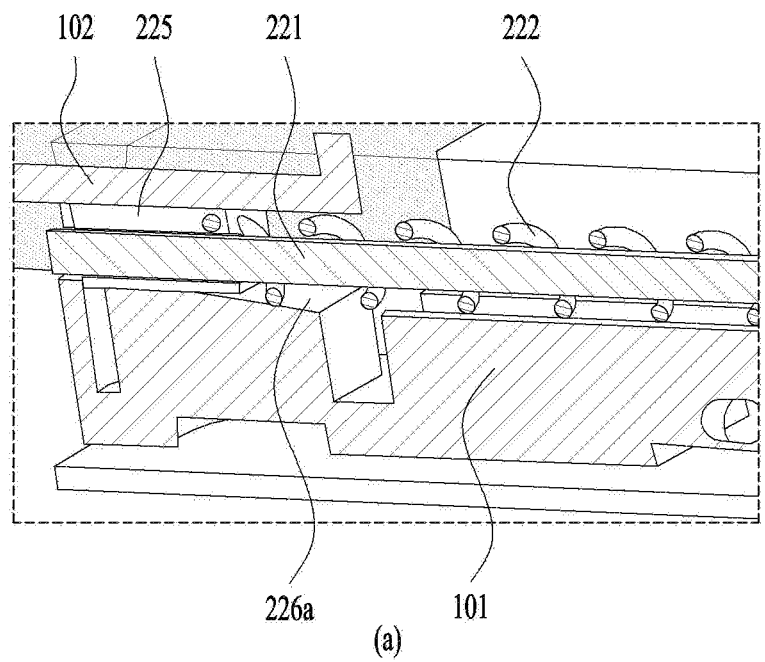
FIG. 9 is a view showing a deceleration part of the mobile terminal.
Figure 9:
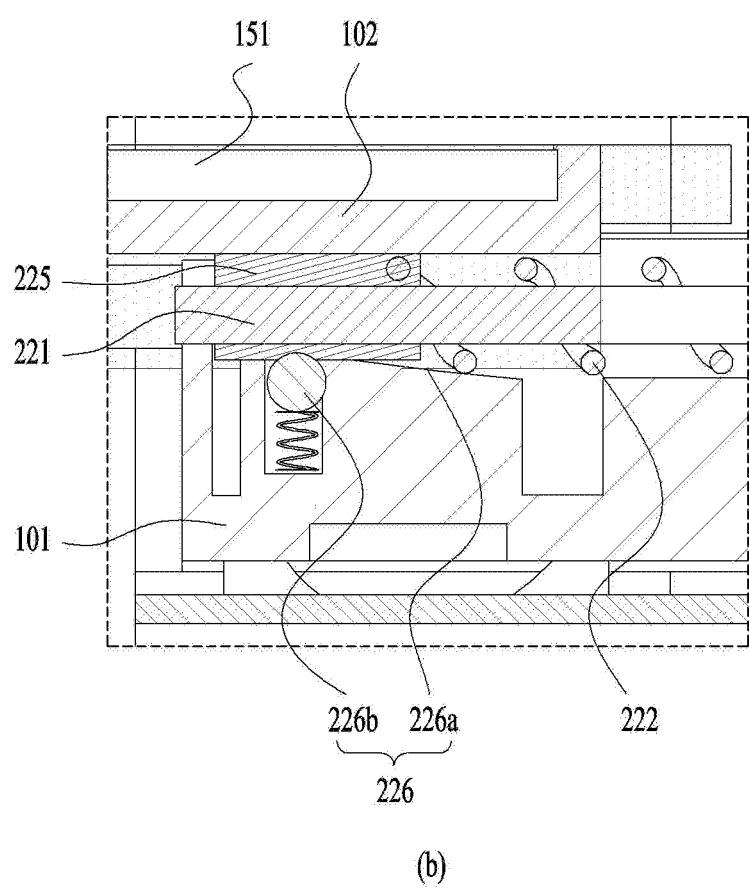

FIG. 9 is a view showing the deceleration part 226 of the mobile terminal 100. As shown in FIG. 9(a), the deceleration part 226 may have a shape gradually rising in the first direction in which the moving block 225 moves. That is, the deceleration part may include an inclined surface 226a whose degree of protrusion is reduced as the inclined surface extends in the second direction. As the moving block 225 moves along the inclined surface 226a, the speed of the second frame 102 can be reduced. The deceleration part 226 can be formed of a soft material such as silicone that causes high friction to stably reduce the speed of the moving block 225 while reducing the noise generated when the deceleration part 226 contacts the moving block 225.

Alternatively, as shown in FIG. 9(b), an elastic pin 226b can be used to restrict the movement of the moving block 225. When the moving block 225 is located at the deceleration part 226, the elastic pin 226b can be pressed inward but may limit the movement of the moving block 225 by pushing the moving block 225 toward the second frame 102.

As described above, the mobile terminal of the present disclosure does not limit the bending point of the flexible display unit to a specific position, and can therefore improve the durability of the flexible display unit. In addition, as a drive unit configured to provide driving force for extension of a frame without a motor is provided, the mounting space required for the drive unit can be reduced and the frame can be moved at a faster speed than when a motor is used. Therefore, usability is improved. Further, as the slide frame moves in operative connection with the movement of the second frame, deformation of the display unit can be performed in operative connection with extension and retraction of the frame.

The above embodiments should be construed in all aspects as illustrative and not restrictive. The scope of the disclosure should be determined by the appended claims and their equivalents, and all changes coming within the meaning and equivalency range of the appended claims are intended to be embraced therein.

What is claimed is:

1. A mobile terminal comprising:
   a first frame;
   a second frame configured to move from the first frame in a first direction to switch the mobile terminal from a first state to a second state and to slidably move toward the first frame in a second direction to switch the mobile terminal from the second state to the first state;
   a slide frame configured to move in the first direction or the second direction with respect to the second frame;
   a flexible display including a first region coupled to the first frame, a second region coupled to the slide frame, and a third region disposed between the first region and the second region, the third region flexibly bending around the second frame; and
   a drive unit configured to move the second frame in the first direction,
   wherein the drive unit comprises:
   a driving elastic part configured to provide a tension force and having one end fixed to the first frame and an opposite end fixed to the second frame; and
   a stopper configured to maintain the driving elastic part in a compressed state when the mobile terminal is in the first state.

2. The mobile terminal of claim 1, wherein the drive unit further comprises a moving block fixed to the second frame, in which the opposite end of the driving elastic part is fixed to the moving block, and
   wherein the stopper comprises:
   a first hook arranged on the moving block; and
   a second hook configured to selectively engage with the first hook.

3. The mobile terminal of claim 2, wherein the stopper further comprises:
   a mode button arranged through the first frame, in which the second hook protrudes from an inner side of the mode button; and
   a button elastic part configured to apply a force to the mode button to maintain the second hook engaged with the first hook.

4. The mobile terminal of claim 2, wherein the drive unit further comprises a guide pole fixed to the first frame and extending in the first direction, and
　　wherein the guide pole penetrates through the moving block such that the moving block moves along the guide pole in the first direction or the second direction.

5. The mobile terminal of claim 4, wherein the driving elastic part comprises a compression spring penetrated by the guide pole.

6. The mobile terminal of claim 2, wherein the first frame comprises a deceleration part protruding toward the moving block, and
　　wherein the deceleration part is positioned in a region in which the moving block is positioned in the second state.

7. The mobile terminal of claim 6, wherein the deceleration part comprises an inclined surface downwardly inclining as the inclined surface extends in the second direction.

8. The mobile terminal of claim 6, wherein the deceleration part comprises an elastic pin configured to apply a force toward the moving block.

9. The mobile terminal of claim 1, further comprising:
　a torsion spring having one end coupled to the second frame and an opposite end coupled to the slide frame,
　　wherein an angle between the one end and the opposite end of the torsion spring is variable.

10. The mobile terminal of claim 9, wherein the one end and the opposite end of the torsion spring are rotatably coupled to the second frame and the slide frame.

11. The mobile terminal of claim 9, wherein a distance between the one end and the opposite end of the torsion spring is the same in the first state and the second state.

12. The mobile terminal of claim 1, wherein the drive unit comprises a motorless drive unit.

13. The mobile terminal of claim 1, wherein the driving elastic part includes a spring compressed in the first state and expanded in the second state.

14. The mobile terminal of claim 1, further comprising:
　a mode button exposed through the first frame and configured to switch the mobile terminal from the first state to the second state.

15. The mobile terminal of claim 14, wherein when the mode button is pressed, the stopper is disengaged and the driving elastic part is transitioned into an uncompressed state.

16. The mobile terminal of claim 15, wherein the mode button includes a first engaging mechanism configured to engage with a second engaging mechanism connected to the opposite end of the driving elastic part.

17. The mobile terminal of claim 1, wherein the flexible display is disposed on outside front and rear surfaces of the mobile terminal.

18. The mobile terminal of claim 17, wherein in the first state, the flexible display is disposed on the front and rear surfaces of the mobile terminal, and
　　wherein in the second state, the flexible display is expanded on the front surface of the mobile terminal and is correspondingly reduced on the rear surface of the mobile terminal.

19. The mobile terminal of claim 1, wherein the driving elastic part is disposed at one edge of the mobile terminal.

20. The mobile terminal of claim 1, further comprising:
　a torsion spring having one end coupled to the second frame and an opposite end coupled to the slide frame, and configured to pull the slide frame in the second direction.

* * * * *